United States Patent [19]

Bainbridge

[11] 4,221,390
[45] Sep. 9, 1980

[54] CONTACT SEAL

[75] Inventor: George E. Bainbridge, Colchester, England

[73] Assignee: Hawker Siddeley Brackett Limited, Hythe, England

[21] Appl. No.: 932,697

[22] Filed: Aug. 10, 1978

[30] Foreign Application Priority Data

Aug. 19, 1977 [GB] United Kingdom ............... 34883/77

[51] Int. Cl.² ........................ F16J 15/34; B01D 33/02
[52] U.S. Cl. ........................................ 277/12; 277/92; 277/DIG. 7; 210/160; 210/400; 277/DIG. 6
[58] Field of Search ........ 277/DIG. 7, 81 R, DIG. 1, 277/92, 93 R, DIG. 6, 95, 237 R, 12, 165; 210/160, 400, 402

[56] References Cited

U.S. PATENT DOCUMENTS

| 1,799,299 | 4/1931 | Johnston | 210/400 |
|---|---|---|---|
| 2,740,648 | 4/1956 | Amblard | 277/81 X |
| 2,886,352 | 5/1959 | Krellner | 277/237 X |
| 2,951,721 | 9/1960 | Asp | 277/237 X |
| 3,276,584 | 10/1966 | Mathewson | 210/402 X |
| 3,389,921 | 6/1968 | Lojkutz | 277/92 X |
| 3,467,399 | 9/1969 | Kelly et al. | 277/237 |
| 3,770,284 | 11/1973 | Galloway | 277/92 |
| 3,802,565 | 4/1974 | Hughes et al. | 210/160 |
| 4,040,952 | 8/1977 | Jopp | 210/400 |

FOREIGN PATENT DOCUMENTS 1050298 12/1966 United Kingdom .

Primary Examiner—Robert S. Ward, Jr.
Attorney, Agent, or Firm—Mason, Fenwick & Lawrence

[57] ABSTRACT

A seal between a surface and an edge or further surface movable with respect to the first surface in a plane parallel to it. A sealing member projects from a seal housing and can move through a predetermined distance with respect to the housing. The sealing member is resiliently urged into the position in which it projects as far as possible beyond the housing.

9 Claims, 5 Drawing Figures

CONTACT SEAL

The invention relates to means for providing a seal between a surface and an adjacent edge or further surface movable with respect to the said surface in a plane parallel to it. It is especially concerned with such seal means which are suitable for use with a screen for screening solids out of contaminated liquids, for example, sewage or industrial effluent.

Water and sewage screens used for medium and fine grade screening are generally one of two kinds, a cup screen, or a band screen. A cup screen comprises a cylindrical drum, rotatably mounted about its horizontally aligned longitudinal axis. The cylindrical surface of the drum is perforated and serves as a screening medium, liquid to be screened being passed either onto the outside of the drum, or, more usually, into the interior of the drum, and screened liquid passing through the screening surface to the other side of the drum. The drum will, in general, be mounted so that it is never wholly submerged in either contaminated or screened liquid, and is rotated during use so as to raise screened solids on the screening surface above the liquid level, thereby allowing them to be washed off the upper portion of the screening surface before that portion moves down again into the liquid.

A band screen, on the other hand, comprises a movable continuous band of screening panels which is carried by at least one continuous chain at each side. Each chain runs in a chain guide in the screen frame, or in tracks attached to walls of a screen housing. The use of a band screen permits a much greater vertical dpeth of screening area, in relation to the horizontal dimensions of the screen, than can be achieved using a cup screen. Two types of band screens have been proposed, a "Straight-Through Flow-" screen and a "Central Flow" screen. In the "Straight-Through Flow" screen, the screening surface of the band faces the flow of liquid to be screened at right angles, and the liquid to be screened passes first through the upward travelling section of the band and then through the downward travelling one, the screen being sealed on both sides, with a slidable seal, onto a screen chamber or housing through which the liquid to be screened is passed and into which the screening band projects. In the case of a "Central Flow" screen, contaminated liquid is passed onto the outside of the screening band on both sides and screened liquid passes into the space between the band sides and out through an opening in one end face of the screen.

In the cases of both cup and band screens, the efficiency of screening is dependent on the clearance between the moving screening surface and the supporting framework, or screen housing. When dealing with coarse screening, that is, removing only relatively large particles of debris from liquids, then the clearance between the moving screening surface and the supporting framework or screen housing can be adequately regulated by the use of adjustable plates giving a fine clearance.

When the required degree of screening is finer, however, it is necessary to reduce leakage between the moving screening surface and its surrounds as much as possible, and this necessitates using a contact seal. It has previously been proposed to provide such a contact seal by using a flexible rubber or neoprene strip pressed against a surface to effect a sliding contact seal. However, on occasions when a heavy debris content in the liquid to be screened causes a hydraulic differential to be set up across the screen, the pressure on this seal is also increased, causing the seal to act as a brake, imposing an excessive load on the screen driving gear, subjecting the screen structure to stress and increasing wear on the seal.

The present invention provides means for providing a seal between a surface and an adjacent edge or further surface movable with respect to the said surface in a plane parallel to it, which means comprises a seal housing, a sealing member which can move through a predetermined distance with respect to the seal housing and at least a portion of which extends beyond the seal housing, and resilient means arranged to tend to urge the sealing member into a position in which the region of the said portion most remote from the housing is located at its furthest possible distance away from the seal housing.

Advantageously, the seal housing comprises a hollow, elongate member provided with a slot extending along its length, the sealing member comprises a base portion contained within the housing and the said portion which extends beyond the seal housing, and the said latter portion is in the form of an elongate member which projects through the slot in the seal housing. Preferably the base portion of the sealing member is wider than the slot so that the said base portion is retained within the seal housing.

Preferably the resilient means is located between the base portion of the sealing member and the inner surface of the seal housing opposite the slot, and the resilient means advantageously comprises resilient foam material, for example, neoprene foam.

The seal member is preferably constructed from a material having a low coefficient of friction, for example, polytetrafluoroethylene (PTFE).

The invention further provides a screen for screening solids out of contaminated liquids, which comprises a screen housing, a screening portion, movable with respect to the screen housing, having a screening surface in the form of a continuous band which, on movement of the screening portion, is arranged to move along a predetermined path, and means arranged to provide a seal between the screen housing and the screening portion, the or each sealing means comprises a seal housing mounted on an edge portion of the screening portion adjacent the screen housing or on the portion of the screen housing adjacent the said edge portion of the screening portion, a sealing member which can move a predetermined amount with respect to the seal housing and at least a portion of which extends beyond the seal housing and contacts the said adjacent portion of the screen housing, or the said adjacent edge portion of the screening portion, as the case may be, and resilient means arranged to tend to urge the sealing member into a position in which the said extending portion of the sealing member is pressed against the respective said adjacent portion and away from the seal housing.

The means for providing a seal preferably comprises a hollow, elongate member provided with a slot extending along its length, the sealing member comprises a base portion contained within the housing and the said portion which extends beyond the seal housing, and the said latter portion is in the form of an elongate member which projects through the slot in the seal housing. The sealing means may further be provided with any or all of the advantageous or preferable optional features of a seal means constructed in accordance with the invention, as described above.

The sealing means may be adjustable, and in any case the seal loading can be preset to suit the conditions of use so that the seal is not substantially affected by hydraulic pressure differential across the screen.

Two forms of screening apparatus provided with sealing means constructed in accordance with the invention will now be described, by way of example, with reference to the accompanying drawings, in which.

Figure 1:
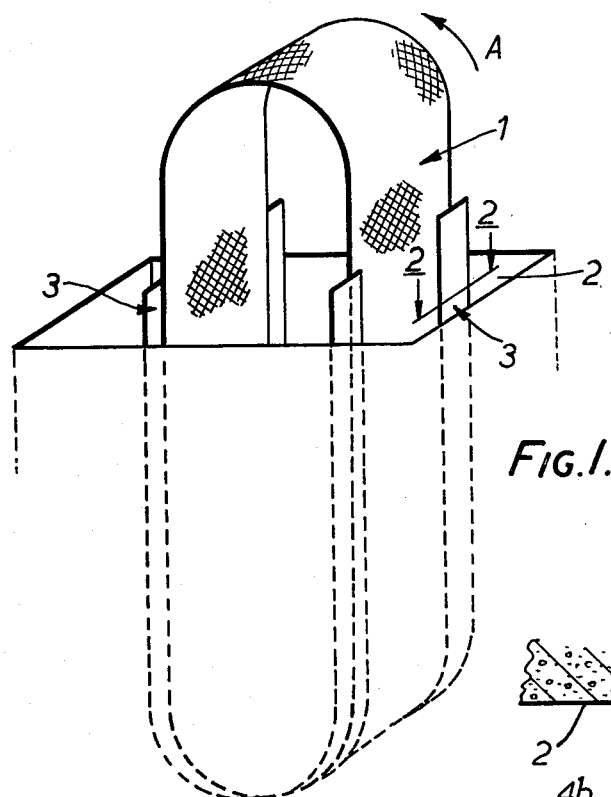
FIG. 1 is a simplified; diagrammatic view of a band screen.

With reference to the drawings, and initially to FIG. 1, an endless band, indicated generally by the reference numeral 1, is made up of a plurality of mesh screening panels (not shown in detail) which are linked to each other with sufficient flexibility to allow the screening band 1 to move over the path defined by its own area, in the direction of the arrow A. The screening band 1 is supported in the position and configuration in which it is shown in FIG. 1 by means of a pair of continuous chains, located one either side of the screening band 1, which are attached to the screening band and which run in roller guides, as will be described in more detail with reference to FIG. 2. The lower portion of the screening band 1 is located within a pit, or screen housing 2, such that the edges of the screening band are located proximate two opposite sides of the housing. The housing 2 is arranged to receive contaminated water introduced into it such that water flows through the screening band 1 from the outside to the inside of the band leaving debris, screened from the water, on the outer surface. Means (not shown) are provided to conduct away screened water through one open end face of the screening band and through the proximate wall of the screen housing 2. Sealing means, indicated generally by the reference numeral 3 and which are described in more detail below with reference to FIGS. 2 and 3, are provided between the walls of the screen housing 2 and the edges of the screening band 1.

Figure 2:
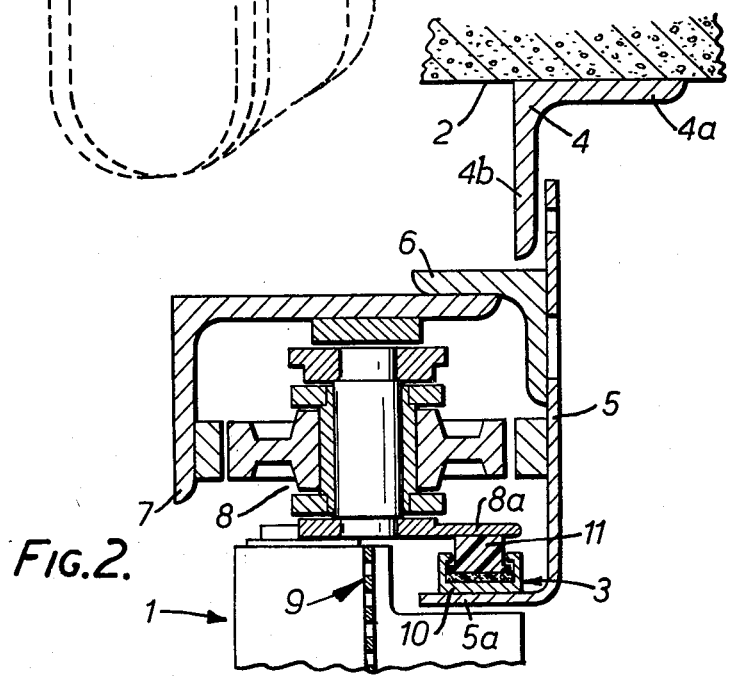
FIG. 2 is a section through part of the screen shown in FIG. 1, taken along the line 2—2.

FIG. 2 is a section through the sealing means and adjacent components on one edge of the screening band 2, showing the guide for a support chain and portions of the wall of the screen housing 2 and of the mesh of the screening band 1. Fixed to the wall of the screen housing 2 is an elongate member 4 having two sides 4a and 4b which meet at a right angle. The elongate member 4 is adjacent to a substantially flat member 5, the edge portion 5a of which remote from the member 4 extends in a plane at right angles to the plane of the rest of the member 5. Further members 6 and 7 are connected directly and indirectly, respectively, to the member 5 so as to form an elongate duct or channel having an opening to the interior of the screen housing which is bounded on either side by the edge of the further member 7 and the edge portion 5a of the member 5, respectively. The duct so formed provides a guide for the support chain, indicated generally by the reference number 8, to which is attached the mesh screening surface 9 of the screening band 1. The chain 8 is provided with a continuous flange 8a, which is carried with the chain as it moves during a screening operation. The edge portion 5a of the member 5 is disposed parallel to the flange 8a and is provided with the sealing means 3 to effect a contact seal between the portion 5a and the flange 8a.

Figure 3:
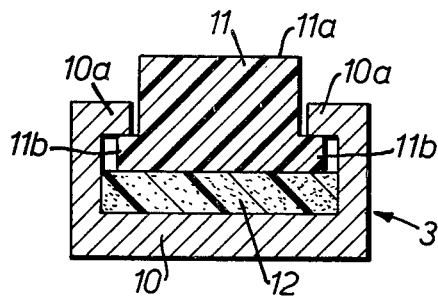
FIG. 3 is a section through sealing means, shown in FIG. 2.

As can be seen most clearly in FIG. 3, the sealing means comprises a seal housing 10 in the form of an elongate member defining a channel bounded on three sides by walls of the seal housing and which has an opening on that side facing the flange 8a. The two side walls of the seal housing 10 are extended over part of the open side so as to form shoulders or flanges 10a bordering the opening in the seal housing; the flanges 10a can be regarded as forming a wall having an opening or aperture therein. A strip-like sealing member 11, made from polytetrafluorethylene (PTFE), projects out through the opening in the seal housing 10 and contacts the flange 8a over a sealing surface 11a. The base of the sealing member is retained in the hollow interior of the seal housing 10 by means of projections 11b formed on the sealing member, which abut the shoulders 10a. A resilient neoprene foam strip 12 is located between the sealing member and the wall of the seal housing opposite the opening in the housing and, when compressed, tends to urge the sealing face 11a against the adjacent surface of the flange 8a to provide a sliding contact seal.

The member 5 is provided with slotted fixing holes for bolting to the member 6. Thus the amount of compression of the resilient strip 12 is adjustable, and at convenient intervals the relative positioning of the members 5 and 6 can be adjusted to take account of wear on the sealing faces 8a and 11a.

The sealing means 3 are provided on opposite sides of the screen housing 2, in those regions where the chains 8 run parallel to the walls of the housing. The sealing means 3 may be extended beyond the top of the pit 2, as shown in FIG. 1, and, in any case, is provided on the pit walls to a height above the maximum liquid level to be present in the pit.

Figure 4:
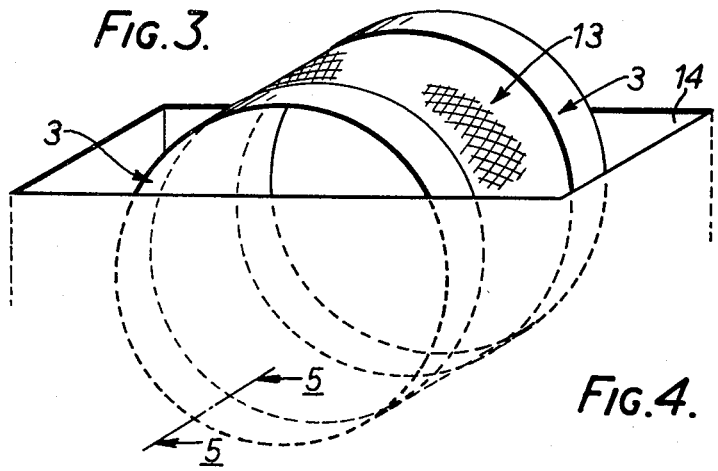
FIG. 4 is a simplified diagrammatic view of a cup screen.

FIG. 4 shows a cup screen comprising a cylindrical, perforated drum, indicated generally by the reference numeral 13, located with its lower portion projecting into a pit or screen housing 14. Sealing means 3 are provided on the edges of the perforated drum 13, all the way around, to prevent leakage between the edges of the drum screen and the walls of the screen housing 14.

Figure 5:
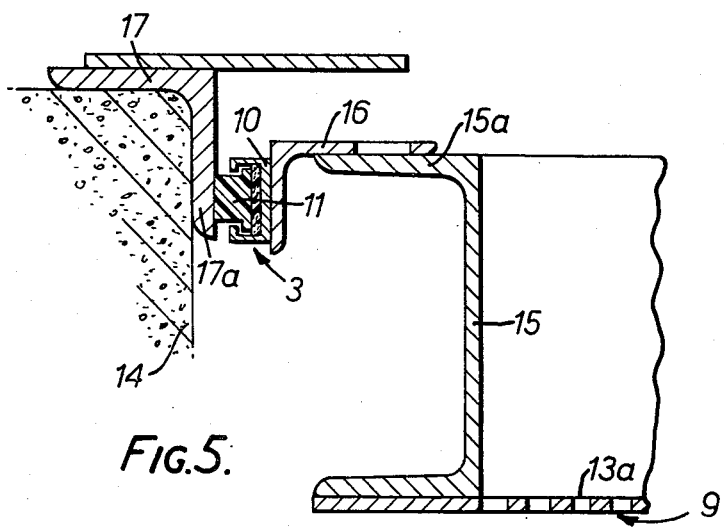
FIG. 5 is a section through part of the screen shown in FIG. 4.

FIG. 5 shows the sealing arrangement of the cylindrical drum screen with respect to the screening housing 14 in more detail.

(Components which are the same as those described above with reference to FIGS. 1, 2 and 3 have the same reference numerals as in these Figures). The sealing means 3 is constructed as described above with especial reference to FIG. 3. A circumferential screen support 15 is attached to the perforated screening surface 13a around each edge portion of the drum 13. A circular member 16 of L-shaped cross-section is fixed to each screen support 15, and the seal housing 10 of the sealing means 3 is secured to the member 16. A sealing angle 17 is fixed to the wall of the screen housing 14, and the sealing face 11a of the sealing strip 11 presses against one side 17a of the sealing angle. A similar sealing arrangement is provided for the other end face of the drum 13.

I claim:

1. Apparatus for screening contaminated liquids, which comprises a screen housing, a screening portion, which screening portion is movable along a predetermined path with respect to the screen housing, a member having a contact surface and fixed to one of the screen housing and the screening portion and sealing means for forming a seal with the contact surface and fixed to the other of the screen housing and the screening portion, the sealing means comprising a seal housing, the seal housing having a first wall, which first wall has an aperture therein, a second wall opposite the first wall, and two opposed side walls joining the first and second walls, a sealing member, which sealing member is movable towards and away from the second wall and has a first portion and a second portion, the first portion being within the seal housing and being wider than the aperture to maintain the first portion captive in the housing, and the second portion projecting through the aperture for contacting the contact surface, and a body of resilient material, the body of resilient material being interposed between the second wall and the first portion of the sealing member and contacting the side walls, movement of the sealing member towards the second wall compressing the resilient material and the resilient material, when compressed, tending to urge the sealing member away from the second wall.

2. Apparatus as claimed in claim 1, wherein the resilient material comprises resilient foam material.

3. Apparatus as claimed in claim 2, wherein the resilient foam material is neoprene foam.

4. Apparatus as claimed in claim 1, wherein the sealing member is constructed from a material having a low coefficient of friction.

5. Apparatus as claimed in claim 4, wherein the sealing member is constructed from polytetrafluoroethylene.

6. Apparatus as claimed in claim 1, wherein the seal housing is elongate and the aperture is a slot extending along the length of the seal housing.

7. Apparatus as claimed in claim 1 having the form of a band screen, the member having the contact surface being fixed to the screening portion and the sealing means being fixed to the screen housing.

8. Apparatus as claimed in claim 1 having the form of a cup screen, the sealing means being fixed to the screening portion and the member having the contact surface being fixed to the screen housing.

9. Apparatus as claimed in claim 1, wherein the sealing means is fixed to the screening portion and the member having the contact surface is fixed to the screen housing, part of the predetermined path being outside the screen housing.

* * * * *